June 28, 1966 W. R. FOWLIE ETAL 3,258,530
FACSIMILE SCANNING MACHINE
Filed June 7, 1962 15 Sheets-Sheet 1

INVENTORS,
WALLACE R. FOWLIE &
JOSEPH BZDELIK, JR.
BY Ooms, McDougall
and Hersh
ATT'YS.

June 28, 1966  W. R. FOWLIE ETAL  3,258,530
FACSIMILE SCANNING MACHINE

Filed June 7, 1962  15 Sheets-Sheet 3

INVENTORS
WALLACE R. FOWLIE &
JOSEPH BZDELIK, JR.
BY Ooms, McDougall
and Hersh
ATT'YS.

June 28, 1966   W. R. FOWLIE ETAL   3,258,530
FACSIMILE SCANNING MACHINE
Filed June 7, 1962   15 Sheets-Sheet 4
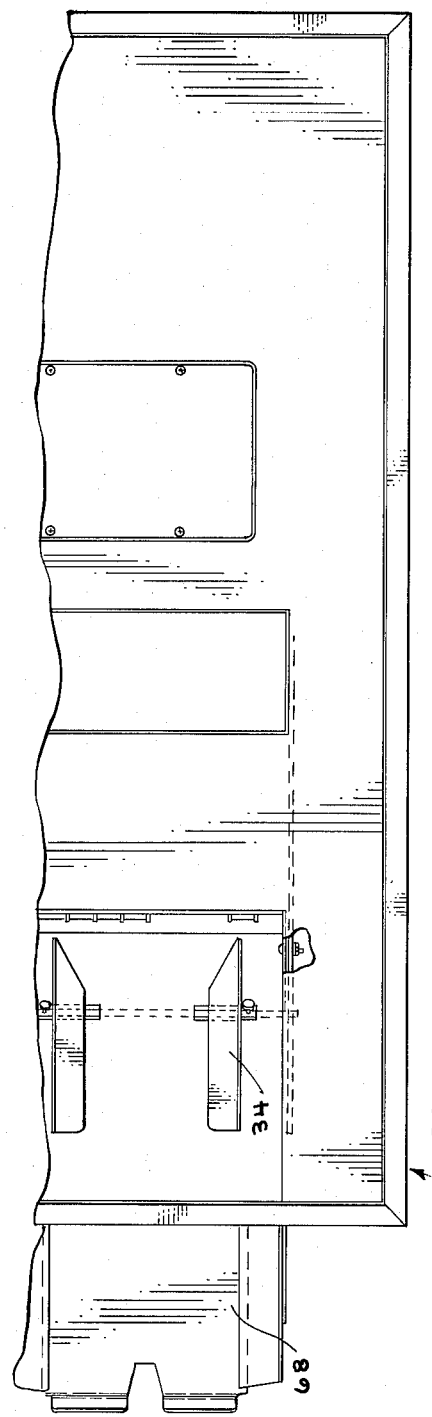
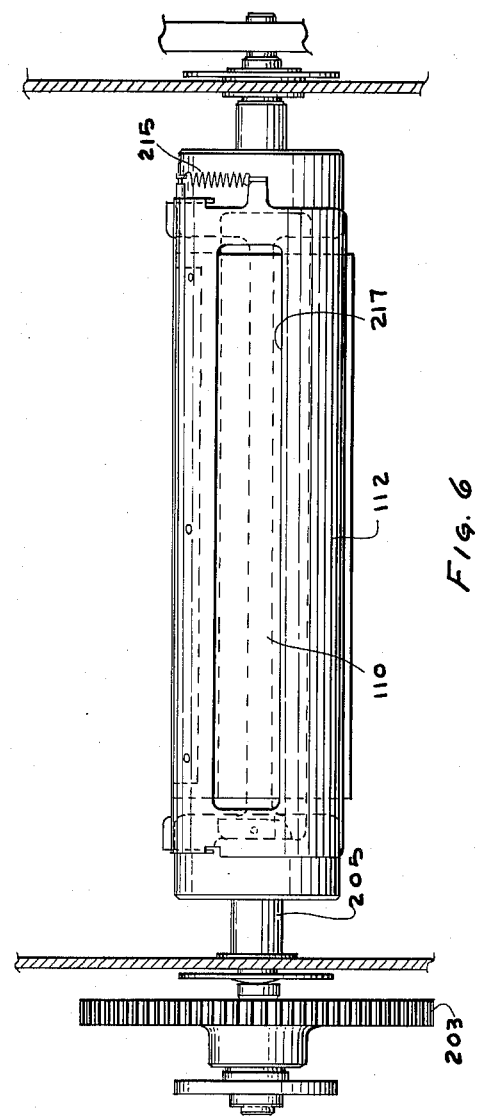
INVENTORS
WALLACE R. FOWLIE &
JOSEPH BZDELIK, JR.
BY Ooms, McDougall
and Hersh
ATT'YS.

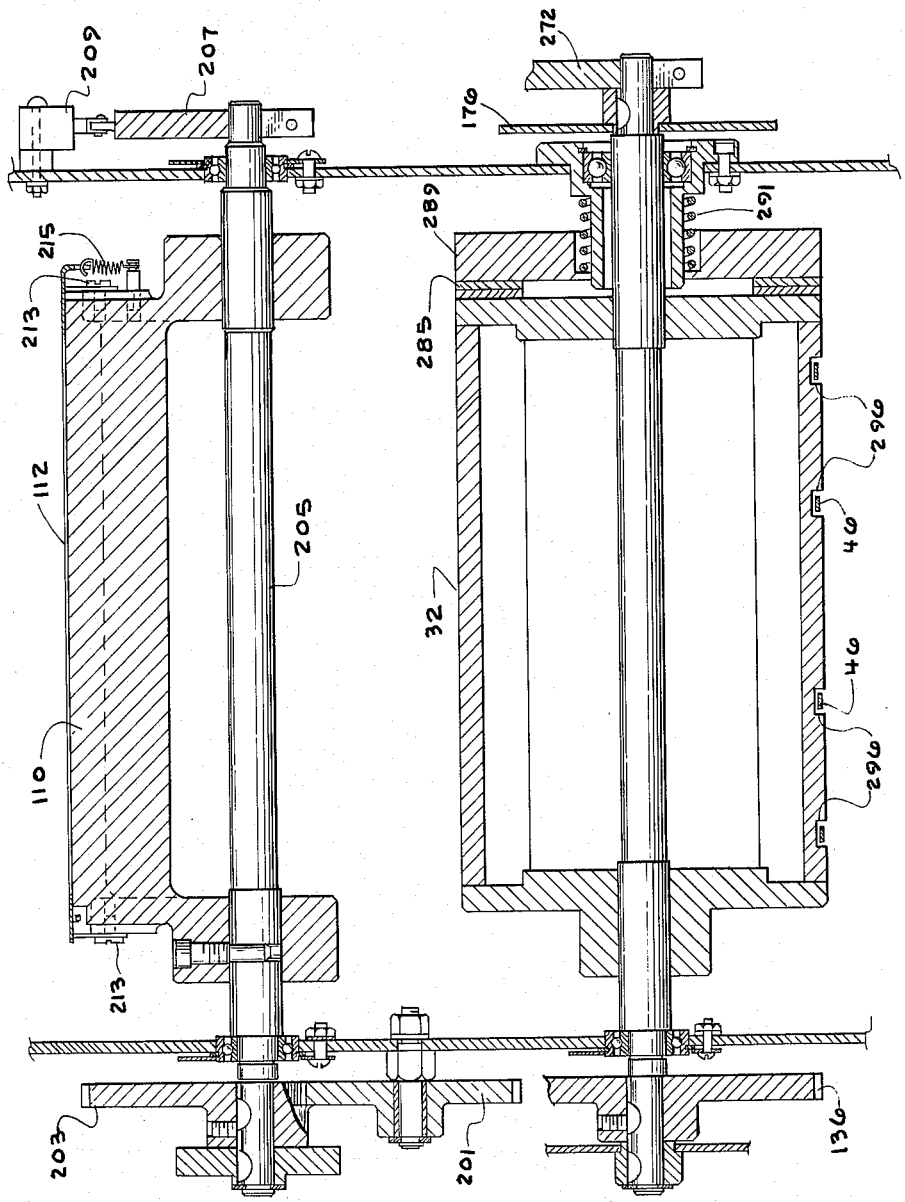

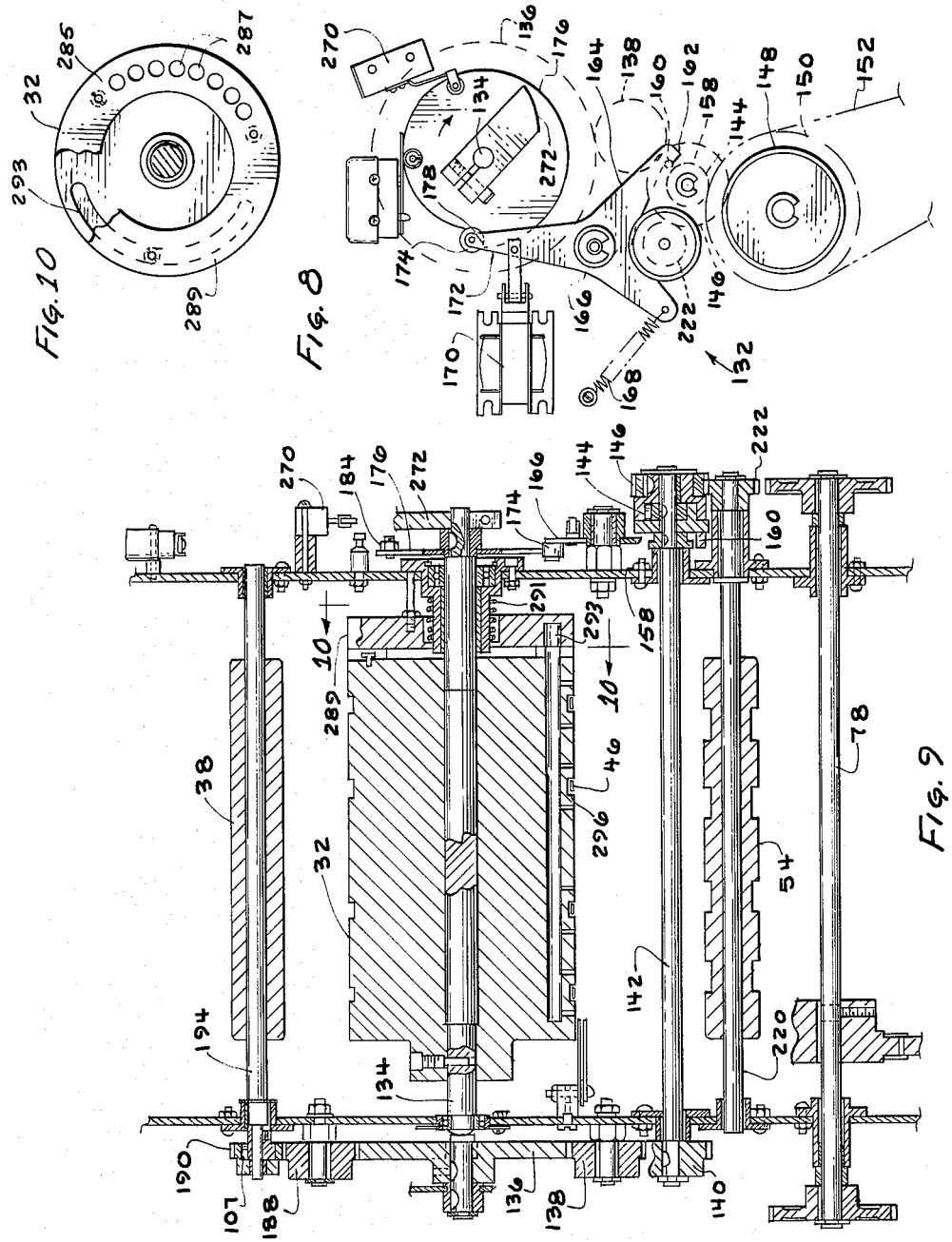

June 28, 1966 W. R. FOWLIE ETAL 3,258,530
FACSIMILE SCANNING MACHINE
Filed June 7, 1962 15 Sheets-Sheet 7
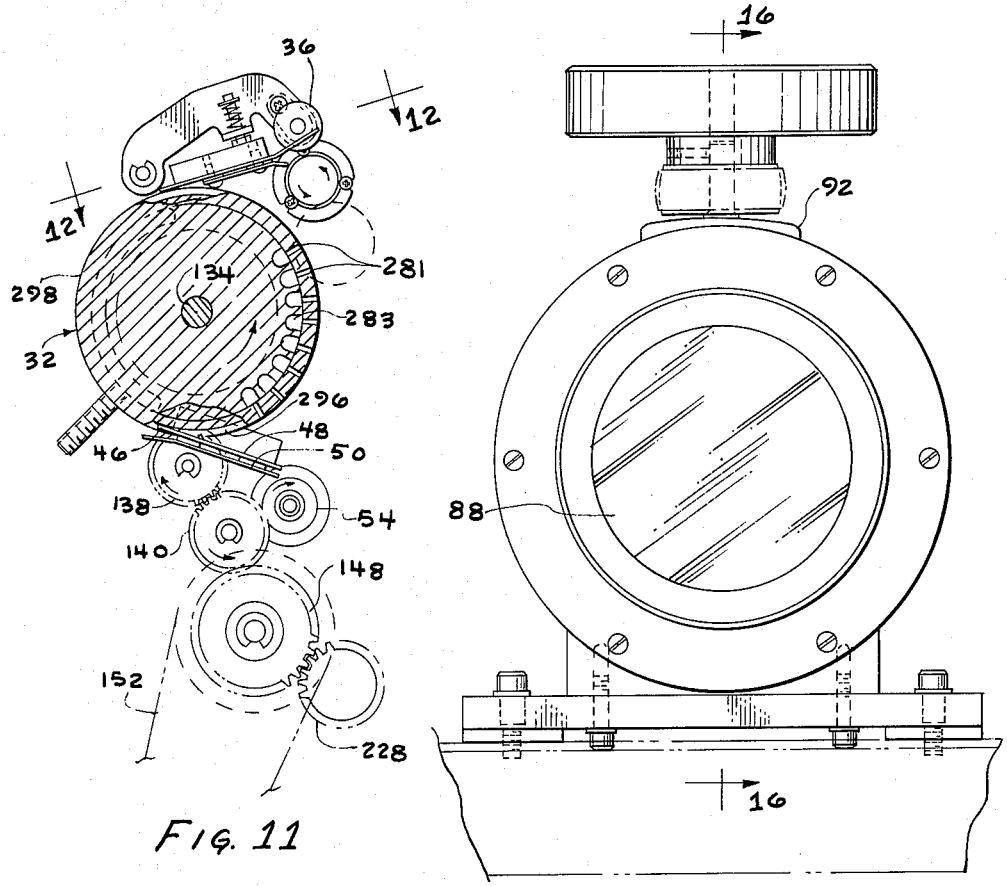
FIG. 11
FIG. 13
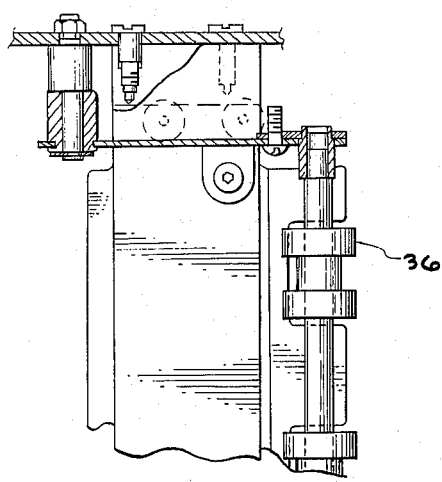
FIG. 12
INVENTORS
WALLACE R. FOWLIE &
JOSEPH BZDELIK, JR.
BY Ooms, McDougall
and Hersh
ATT'YS.

June 28, 1966 W. R. FOWLIE ETAL 3,258,530
FACSIMILE SCANNING MACHINE
Filed June 7, 1962 15 Sheets-Sheet 9
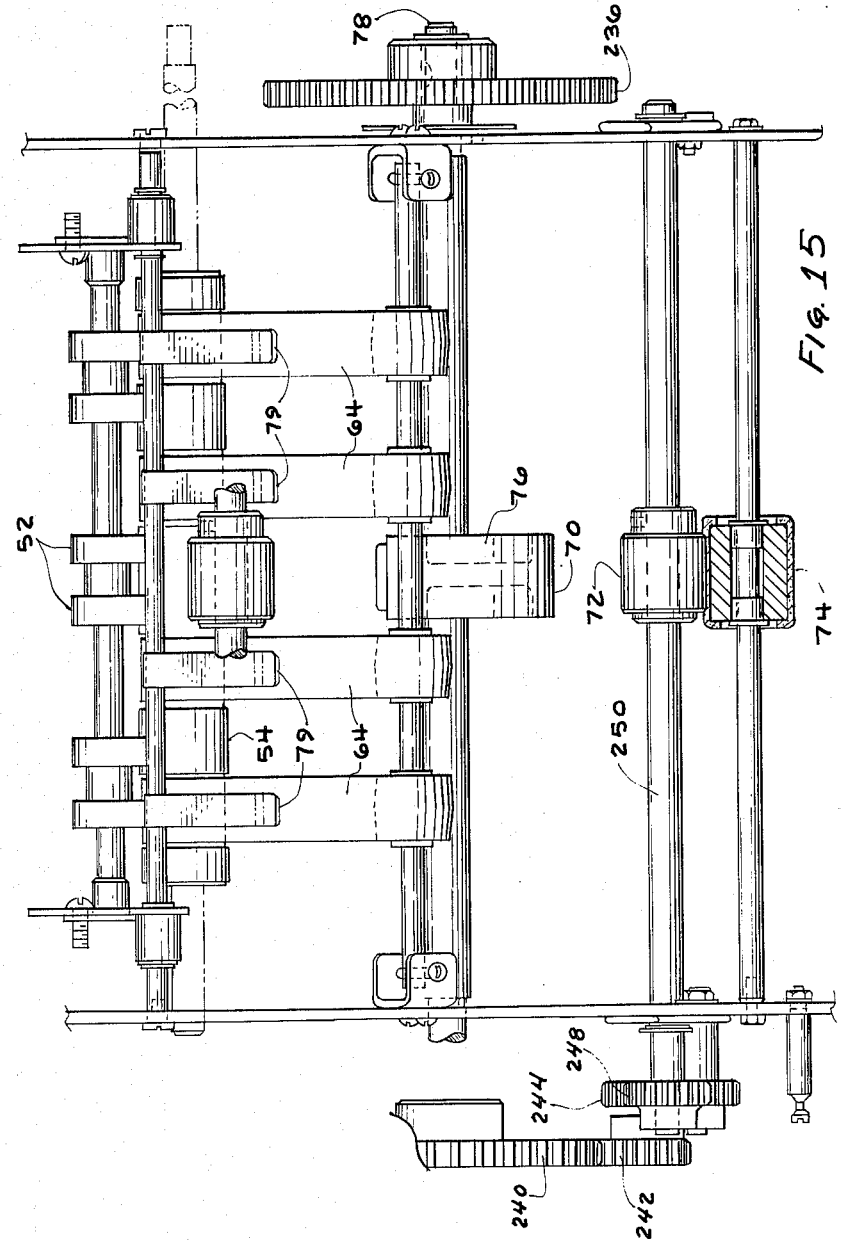
INVENTORS
WALLACE R. FOWLIE &
JOSEPH BZDELIK, JR.
BY Ooms, McDougall
and Hersh
ATT'YS.

June 28, 1966  W. R. FOWLIE ETAL  3,258,530
FACSIMILE SCANNING MACHINE
Filed June 7, 1962  15 Sheets-Sheet 10
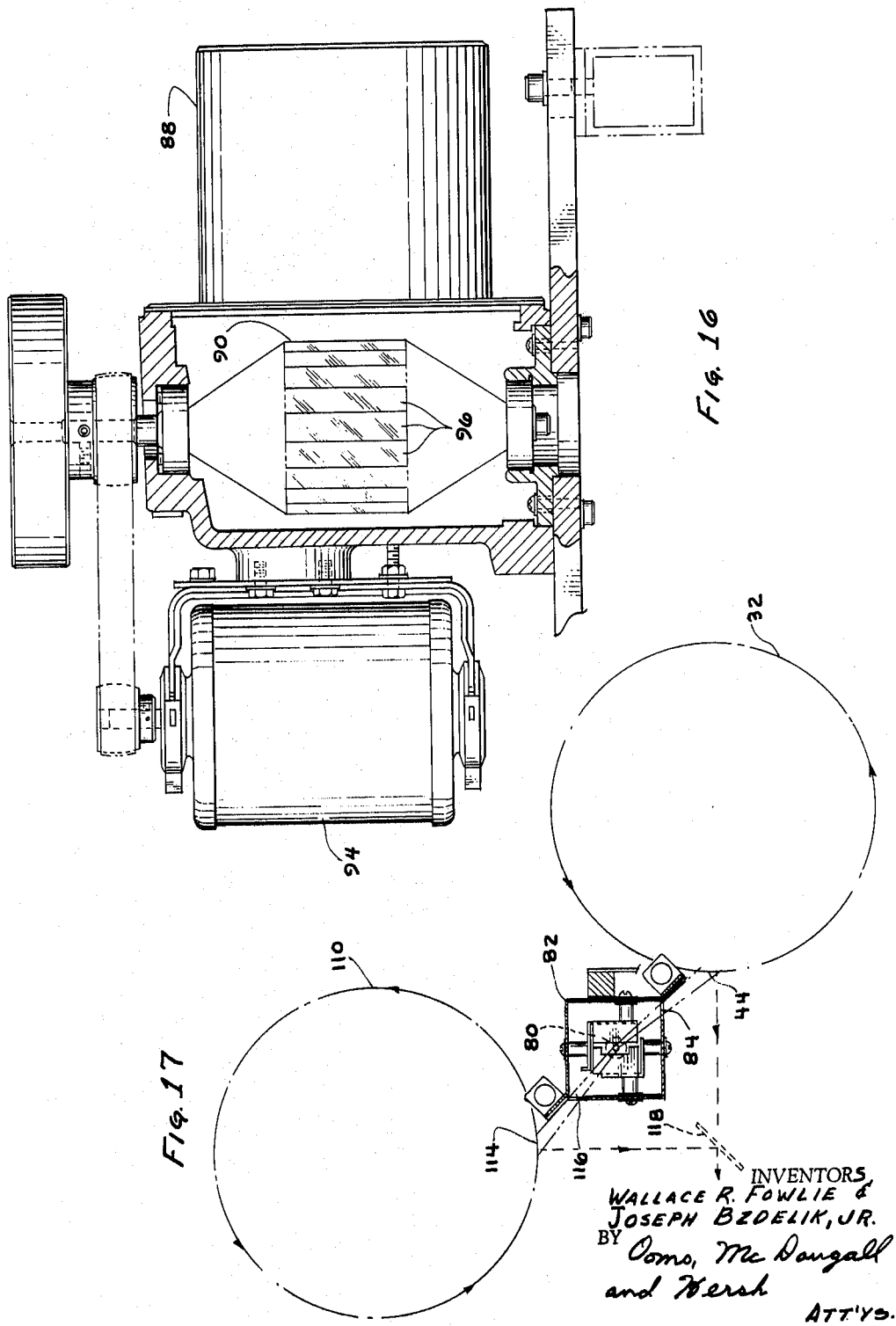
INVENTORS
WALLACE R. FOWLIE &
JOSEPH BZDELIK, JR.
BY Ooms, McDougall
and Hersh
ATT'YS.

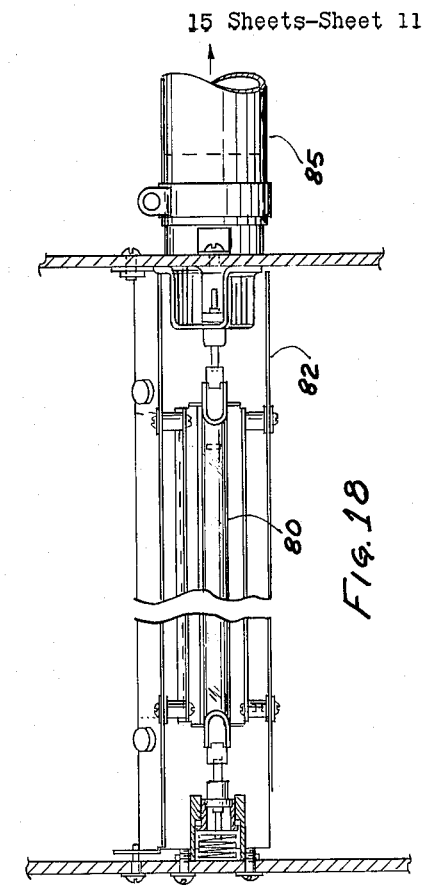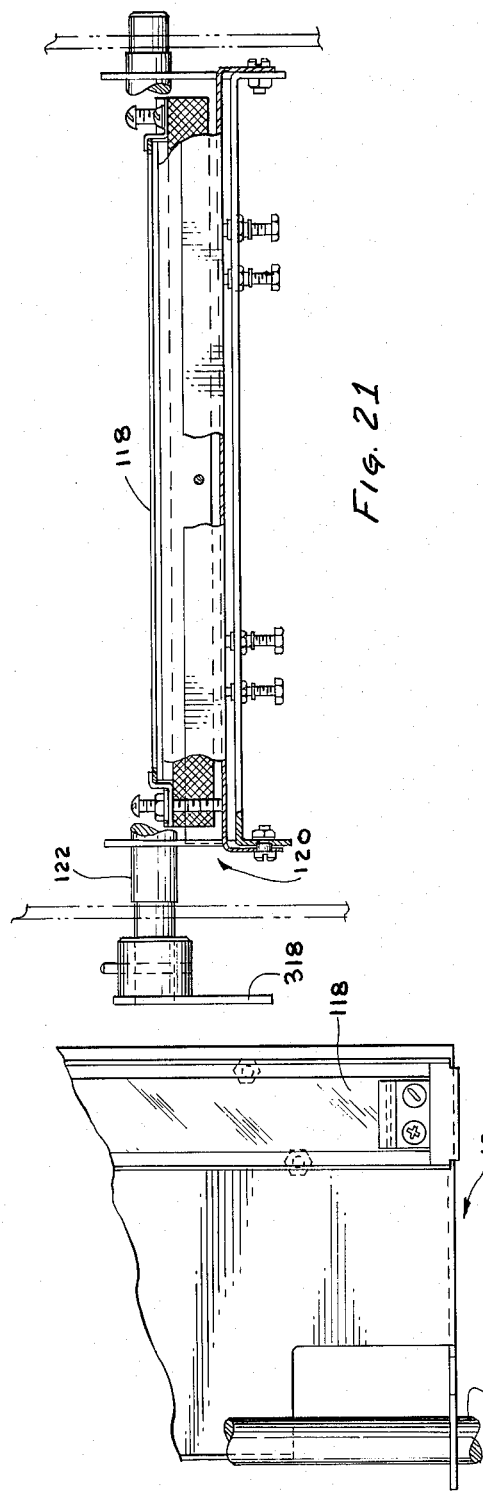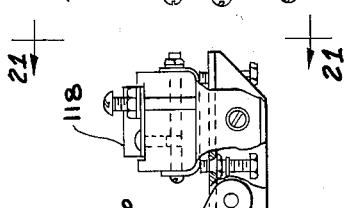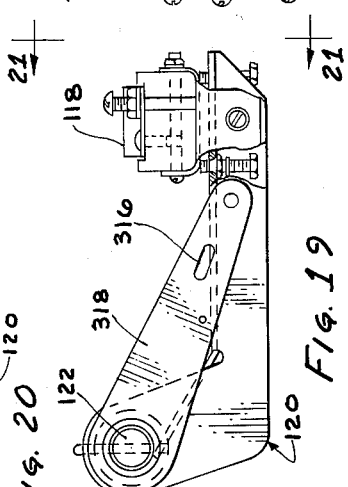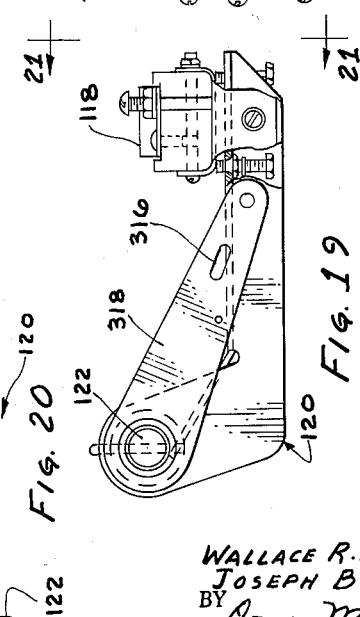
June 28, 1966 W. R. FOWLIE ETAL 3,258,530
FACSIMILE SCANNING MACHINE
Filed June 7, 1962 15 Sheets-Sheet 11
INVENTORS,
WALLACE R. FOWLIE &
JOSEPH BZDELIK, JR.
BY Ooms, McDougall and Hersh
ATT'YS.

INVENTORS
WALLACE R. FOWLIE &
JOSEPH BZDELIK, JR.
BY
Ooms, McDougall
and Hersh
ATT'YS.

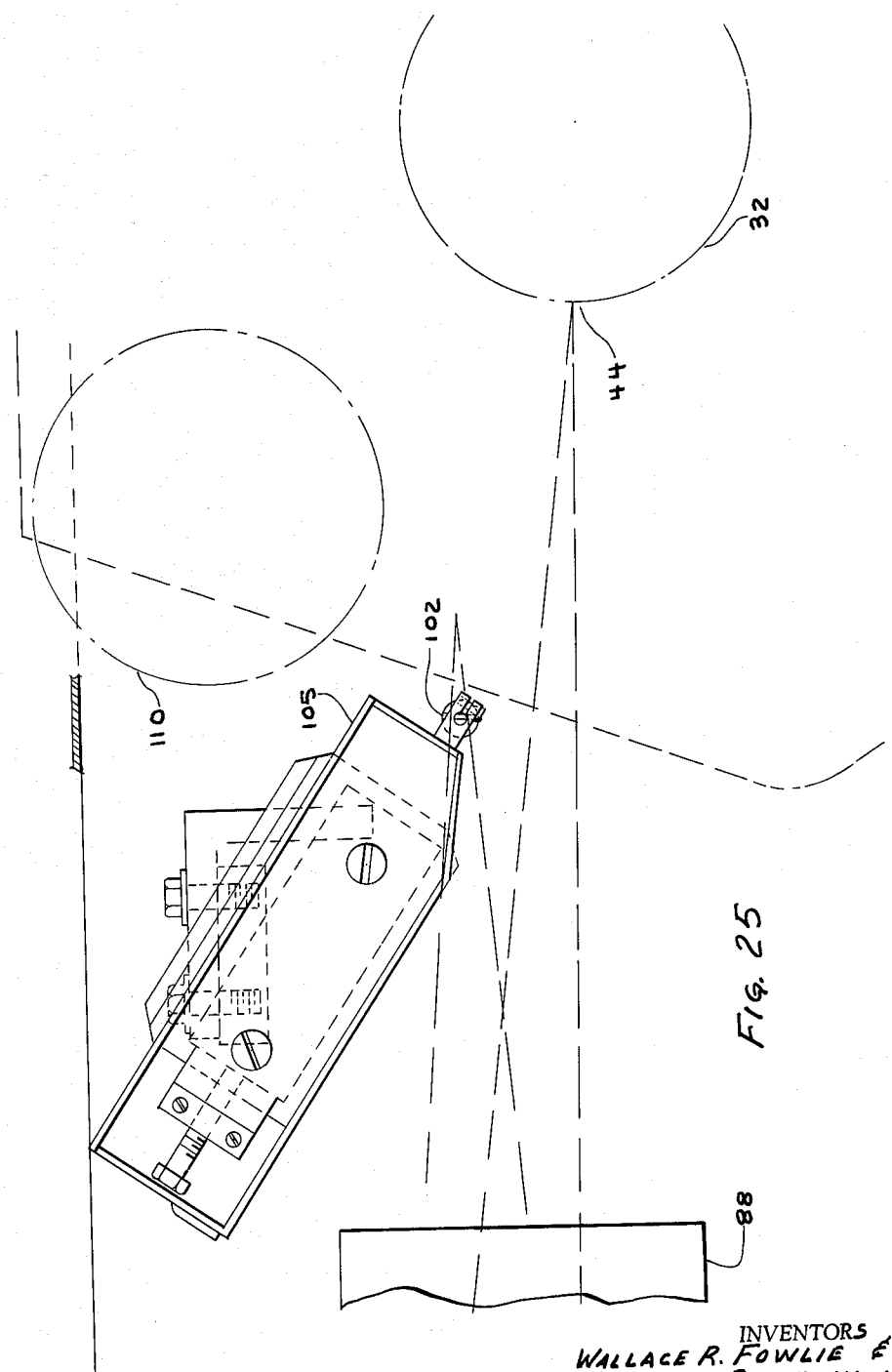

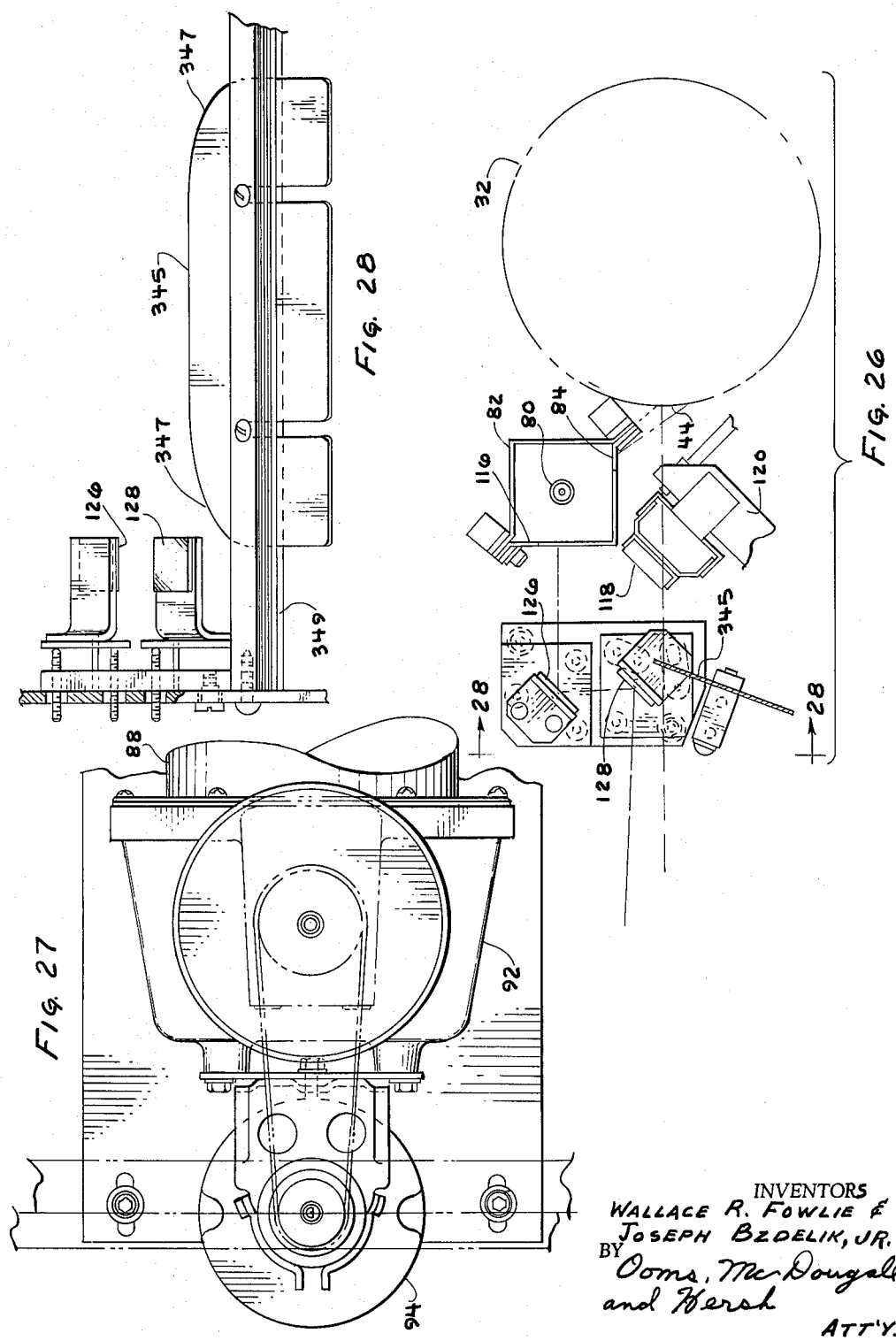

(United States Patent Office)

3,258,530
Patented June 28, 1966

3,258,530
FACSIMILE SCANNING MACHINE
Wallace R. Fowlie, North Riverside, and Joseph Bzdelik, Jr., Morton Grove, Ill., assignors to A. B. Dick Company, Chicago, Ill., a corporation of Illinois
Filed June 7, 1962, Ser. No. 200,684
18 Claims. (Cl. 178—7.1)

This invention relates to a facsimile system whereby copies of documents, drawings, printed matter and the like may be transmitted to a more or less distant point over a wire or radio circuit. In particular, the present invention relates to a new and improved facsimile scanning machine for scanning documents or the like and generating electrical facsimile signals for transmission to the distant point.

One object of the present invention is to provide a facsimile scanning machine having a new and improved mechanism for feeding the individual documents through the machine while maintaining the documents under full control at all times.

A further object is to provide a new and improved machine of the foregoing character in which the documents are carried around a main cylinder, on which the documents are scanned, by an arrangement of vacuum ports on the cylinder.

Another object is to provide a new and improved scanning machine having means for holding a heading or code strip which is scanned, together with means for scanning the code strip immediately prior to the scanning of each document, so that the code strip will be printed as a heading on each document at the facsimile receiving station.

It is a further object to provide a new and improved scanning machine of the foregoing character having a mirror which is movable to a first position for scanning the code strip and a second position for scanning each document.

Another object is to provide a new and improved scanning machine having means for stamping each document with an identifying symbol, after the document has been scanned, to indicate that the document has been transmitted over the facsimile system.

Further objects and advantages of the present invention will appear from the following description, taken with the accompanying drawings, in which:

FIG. 5 is a fragmentary top view of the machine.

FIG. 6 is a fragmentary plan view showing the code strip holder.

FIG. 7 is a section through the main cylinder and the code strip holder, generally along a broken line 7—7 in FIG. 4.

FIG. 8 is a schematic elevation of the drive for the main cylinder.

FIG. 9 is a section taken longitudinally through the main cylinder and the associated rollers and drive gearing.

FIG. 10 is a cross-sectional view showing the main cylinder and the associated vacuum valve arrangement, generally along a broken line 10—10 in FIG. 9.

FIG. 11 is a cross-sectional view showing the main cylinder and associated gears and rollers.

FIG. 12 is a section taken generally along a line 12—12 in FIG. 11.

FIG. 13 is a fragmentary front view of the focusing lens and rotary mirror housing of the scanner.

FIG. 15 is a fragmentary elevational view taken generally as indicated by the line 15—15 in FIG. 14.

FIG. 16 is an elevational section taken through the rotary mirror housing, generally along a line 16—16 in FIG. 13.

FIG. 17 is a diagrammatic cross-sectional view through the lamp housing of the scanner.

FIG. 18 is a longitudinal section through the lamp housing.

FIG. 19 is a fragmentary side elevation showing the movable flip mirror whereby the code strip is scanned.

FIG. 20 is a fragmentary plan view of the flip mirror.

FIG. 21 is a fragmentary elevation taken generally as indicated by the line 21—21 in FIG. 19.

FIG. 25 is a schematic elevation showing the photo tube housing and the associated parts of the scanner.

FIG. 26 is a diagrammatic elevation showing the synchronizing spot mirrors and other associated parts of the scanner.

FIG. 27 is a fragmentary plan view of the rotary mirror housing.

FIG. 28 is a fragmentary elevation taken generally along a line 28—28 in FIG. 26.

Figure 1:
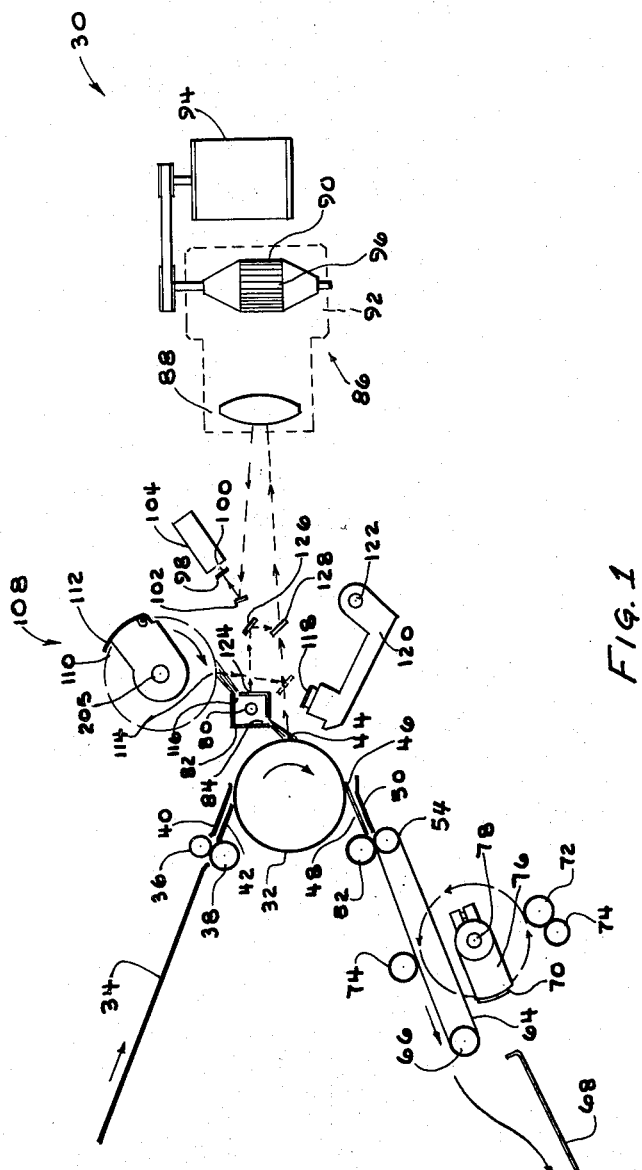
FIG. 1 is a general schematic elevational view of a facsimile scanning machine to be described as an illustrative embodiment of the present invention.

As already indicated, FIG. 1 illustrates the general layout of a facsimile scanning machine 30 to be described as an illustrative embodiment of the present invention. The machine 30 is adapted to scan documents, drawings, printed matter and the like and translate the documents into electrical facsimile signals which may be transmitted over a wire or radio circuit to a more or less distant receiving station, where a printer (not shown) is provided to reproduce the document. In the illustrated machine 30, the document is scanned as it passes around a main cylinder or drum 32. The document to be scanned is placed on an inclined feed table or platform 34 and is fed between a pair of nip rollers 36 and 38 which propel the document between guide plates 40 and 42 to the main cylinder 32. Means are provided on the main cylinder 32 to hold the leading portion of the document against the cylinder as the cylinder is rotated. The document is scanned as it passes a scanning zone or station 44. Preferably, the document is held against the cylinder 32 by the use of vacuum. Thus, the cylinder 32 is provided with an arrangement of vacuum ports, to be described in detail shortly.

After being scanned, the document is stripped from the surface of the cylinder 32 by stripper fingers 46 and is directed between guide plates 48 and 50. Next, the document passes between nip rollers 52 and 54.

Figure 14:
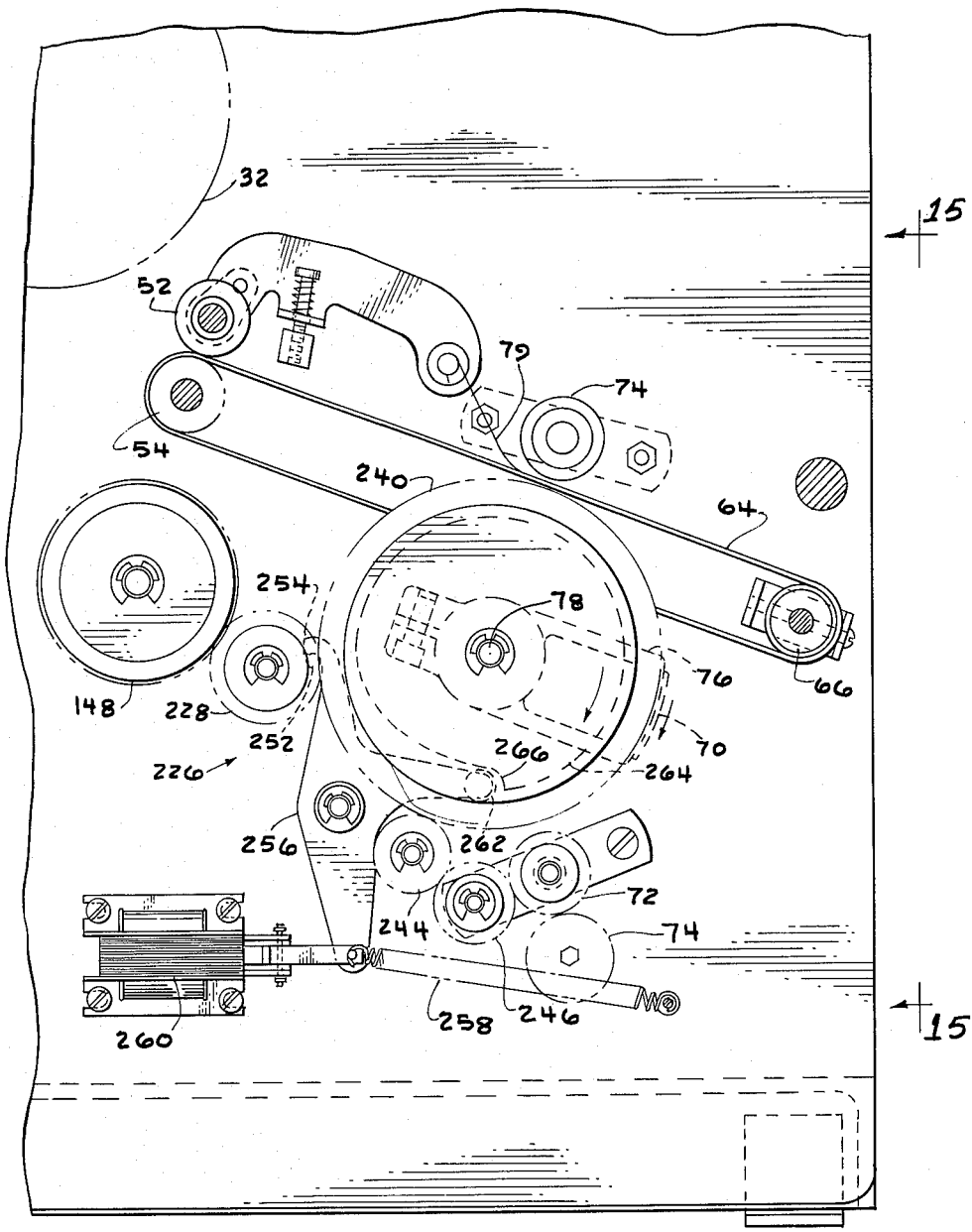
FIG. 14 is a fragmentary elevational section showing the delivery mechanism for the documents, with the associated drive and the stamping mechanism.

One or more conveyor tapes or belts 64 are looped around the roller 54 and another roller 66, to carry the document to a receiving tray 68. In traveling along the tapes 64, the document is preferably marked with an identifying symbol by a rotary stamp 70, so that it will be apparent upon inspection of the document that it has already been transmitted over the facsimile system. The stamp 70 preferably is rotated through a single revolution for each cycle of the machine, so that each document is marked with only a single identifying symbol. Starting from the position shown in FIG. 1, the stamp first engages an ink transferring roller 72 and then engages the face of the document as the document passes between the stamp 70 and an impression or backup roller 74, disposed above the tapes 64. The roller 72 receives its ink from an ink pad roller 74, to which ink may be applied at infrequent intervals by the operators. The stamp 70 may be made of rubber or other suitable material and may be mounted on an arm 76 secured to a rotatable shaft 78. Spring fingers 79 (FIGS. 14 and 15) may be employed to hold the document against the tapes 64.

Figure 2:
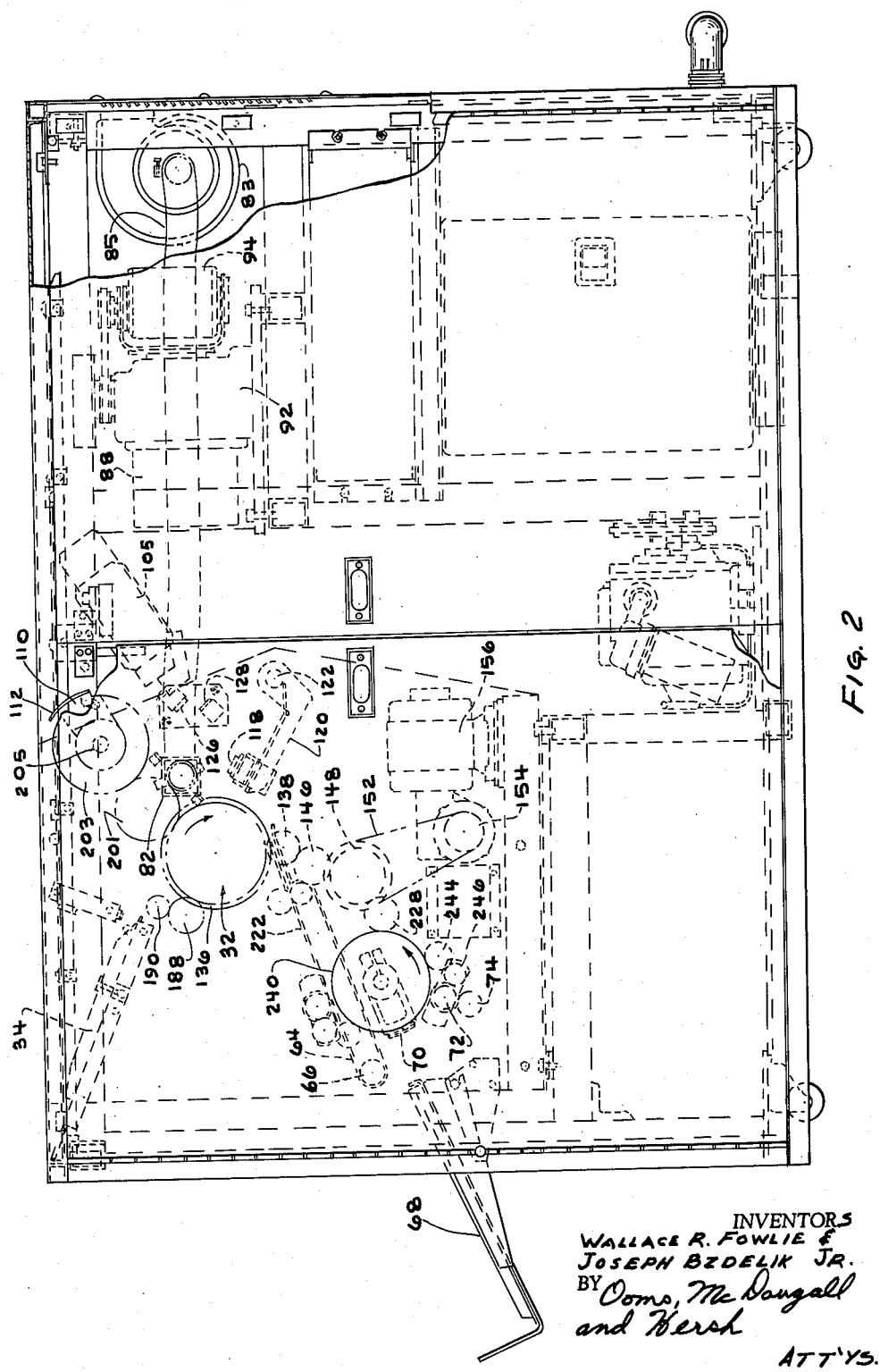
FIG. 2 is a general side view of the machine, with certain portions broken away.
Figure 3:
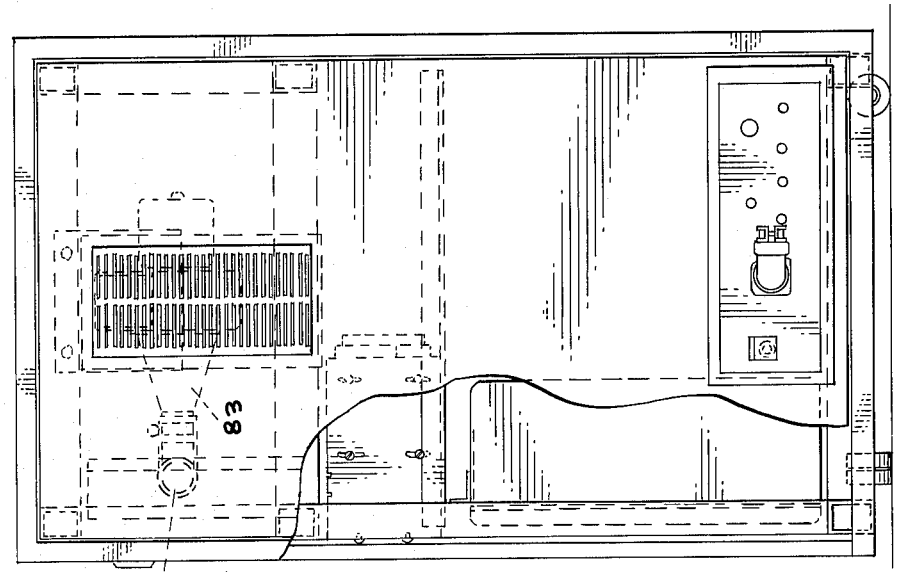
FIG. 3 is a general rear view, with a portion broken away.
Figure 4:
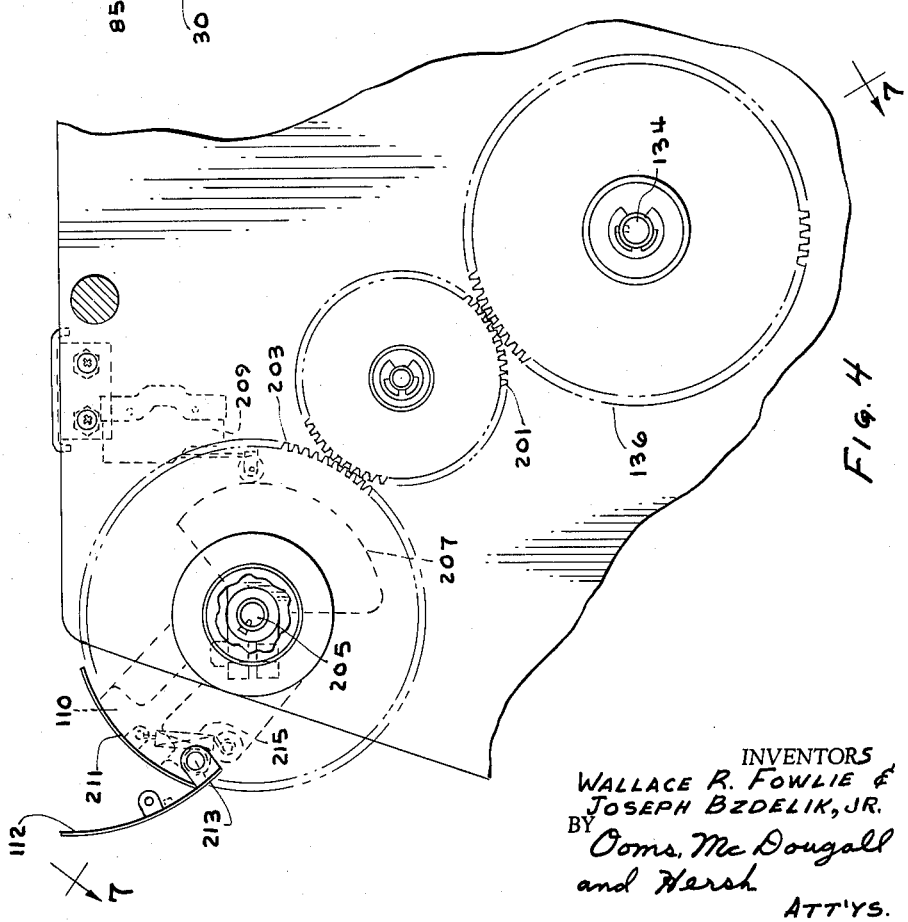
FIG. 4 is a fragmentary side view of the holder for the code or heading strip, and the associated drive.

At the scanning zone or station, the document is brightly illuminated by means of a tubular or elongated lamp 80 mounted in a lamp housing 82. A slot 84 is formed in the lamp housing to permit light from the lamp 80 to shine upon the document in the zone 44. The lamp housing 82 may be cooled by means of a suction blower 83 which withdraws hot air from one end of the housing through a hose or conduit 85 (FIGS. 2 and 3).

The illuminated zone 44 of the document is scanned by means of an apparatus 86 comprising a lens 88 and a rotary mirror 90, mounted in a mirror housing 92. The mirror 90 may be driven at high speed by means of an electric motor 94. The mirror 90 is of the type having a large number of faces 96, disposed at different angles around the axis of rotation of the mirror. Thus, for example, the mirror 90 may have twenty faces.

The lens 88 preferably collimates the light received from the document so that the light rays striking the mirror 90 are substantially parallel. After being reflected by the mirror 90, the light rays again pass through the lens 88 and are focused on a screen or target 98 having a small aperture 100 therein. A mirror 102 may be provided to reflect the light rays against the target 98. Thus, an image of a portion of the document is produced on the target 98. The action of the many-sided rotary mirror 90 sweeps the image repeatedly across the target so that the light passing through the aperture 100 in the target represents successive elements of the document. These elements are translated into electrical signals by means of a phototube 104 disposed behind the target. It will be realized that any suitable photoelectric translator may be employed in place of the phototube 104. The phototube 104 and the target 98 are enclosed in a housing 105 (FIG. 2).

The rotary motion of the mirror 90, combined with the motion of the document around the main cylinder or drum 32 has the effect of scanning the document along a series of closely spaced lines which are nearly horizontal but actually are slightly inclined across the document. Each face 96 of the mirror 90 accounts for one of the successive lines of the scanning pattern.

As will be described in detail shortly, the main cylinder 32 preferably rotates through only a single revolution for each cycle of the machine. This revolution is sufficient to advance the leading edge of the document into the nib between the rollers 52 and 54. For a relatively long document, the cylinder 32 may complete its single revolution before the entire document has moved around the cylinder. In that case, the document is pulled around the cylinder 32 with a sliding action by the nip rollers 52 and 54, which may rotate continuously. Likewise, the roller 66 may rotate continuously. The rollers 36 and 38 may be driven with the main cylinder 32 but may be provided with a free-wheeling or overrunning clutch 107 (FIG. 9) so that the tail end of the document may be pulled between the rollers 36 and 38 by the action of the rollers 52 and 54.

The illustrated machine 30 is provided with a code strip mechanism 108 (FIG. 1) whereby a code or heading strip may be scanned prior to the scanning of each document. In this way, the material on the code strip will be printed as a heading on each document reproduced at the receiving station. The code strip may show the point of transmission, the desired destination and other information.

As illustrated, the code strip mechanism 108 comprises a rotary code strip holder 110 which is rotated through a single revolution for each cycle of the machine. A clamping plate 112 or the like is provided on the holder 110 to secure any desired code strip to the holder. When the code strip holder 110 is rotated, the code strip is scanned as it passes a zone 114, which is illuminated by the lamp 80 through a slot 116 in the lamp housing 82.

A movable flip mirror 118 is provided to reflect the light from the code strip zone 114 into the lens 88. In this case, the mirror 118 is mounted on a swingable arm or carriage 120 which is secured to a shaft 122. It will be seen that the flip mirror 118 is movable between a retracted position, shown in full lines in FIG. 1, and an advanced position, shown in broken lines. In its retracted position, the flip mirror 118 diverts the light from the zone 114 away from the lens 88. When the mirror 118 is raised to its advanced position, the mirror cuts off the passage of light from the main cylinder 32 to the lens 88 and reflects the light from the code strip scanning zone 114 to the lens. As will be described in greater detail shortly, the flip mirror 118 is raised during the initial portion of the cycle of the machine, so that the code strip will be scanned, and then is dropped to its retracted position so that the document on the main cylinder 32 will be scanned.

To generate synchronizing pulses, an arrangement is provided to develop a fixed synchronizing spot of light which is scanned by each face 96 of the rotary mirror 90. In this case, the synchronizing spot is provided by a small aperture 124 in the lamp housing 82. The synchronizing spot is reflected downwardly by a diagonal mirror 126 and then rearwardly into the lens 88 by a diagonal mirror 128. It will be seen that the mirror 128 is disposed between the main scanning zone 44 and the lens 88, but the mirror 128 is so small that it does not substantially obstruct the passage of light from the scanning zone 44 to the lens 88.

It has already been indicated that the main cylinder 32 is preferably rotated through a single revolution for each document which is to be scanned by the machine. Those skilled in the art will be familiar with the various single-revolution drive mechanisms which may be employed to rotate the main cylinder 32 through a single revolution at the command of the operator.

By way of example, a single-revolution clutch mechanism 132 is illustrated in FIGS. 8 and 9. As shown, the main cylinder 32 is secured to a shaft 134 to which a drive gear 136 is also secured. The gear 136 meshes with an idler gear 138 which in turn meshes with a gear 140 secured to a shaft 142. The gear 136 is larger than the gear 140 so that, in this case, the main cylinder shaft 134 rotates at one-third the speed of the shaft 142. A wedging type control clutch 144 is connected between a gear 146 and the shaft 142. The gear 146 is continuously driven by a gear 148 which is secured to a sprocket 150 driven by a chain 152. It will be seen from FIG. 2 that the chain 152 is looped around a sprocket 154 driven by an electric motor 156.

The clutch 144 is of the well known type having a control hub 158 which is adapted to rotate with the gear 146 and the shaft 142 when the clutch is engaged. However, the hub 158 may be stopped to disengage the clutch so that the shaft 142 will stop while the gear 146 continues to run. A pin 160 or the like may be mounted on the hub 158 for stopping the hub.

In the illustrated mechanism 132, the pin 160 is adapted to be stopped by a hook 162 which is formed on one arm 164 of a swingable lever 166. A spring 168 normally biases the lever in such a direction (clockwise) as to move the hook 162 into the path of the pin 160. Thus, the clutch 144 is normally disengaged so that the main cylinder 32 is stationary.

In this case, a solenoid 170, operable by the operator of the machine, is connected to another arm 172 of the lever 166 for swinging the lever in a counterclockwise direction so as to release the hook 162 from the clutch pin 160. Thus, energization of the solenoid 170 immediately causes engagement of the clutch 144 so that the clutch transmits power between the gear 146 and the shaft 142.

In the illustrated arrangement, the arm 172 also carries a roller 174 which is engageable with an indexing or stopping cam 176 on the main cylinder shaft 134. The cam 176 has a steeply rising portion or stop 178 adapted to abut against the roller 174 in the initial or home position of the cam 176. The movement of the lever 166 by the solenoid 170 causes the roller 174 to be disengaged from the stop 178 on the cam 176 so that the main cylinder 32 can rotate.

When the solenoid 170 is energized momentarily, the main cylinder 32 and the cam 176 are rotated through one revolution while the gear 146 and the shaft 142 are rotated through three revolutions. The lever 166 is thus released for clockwise movement by the spring 168, under the control of the cam 176, so that the hook 162 will arrest the pin 160. In this way, the clutch 144 is disengaged. The stop 178 on the cam 176 engages the roller 174 so that the main cylinder 32 will be stopped with a high degree of accuracy in its home or initial position.

In this case, the feed roller 38 is driven by the main cylinder 32 through an idler gear 188 which meshes with the main cylinder gear 136, and a gear 190 which meshes with the idler 188. The one-way or overrunning clutch 107 is connected between the gear 190 and a shaft 194, on which the roller 38 is mounted. The roller 36 is pressed against the roller 38 and is driven by friction.

The code strip holder 110 may be driven from the main cylinder 32 by means of a gear train, including an idler gear 201 which meshes with the main cylinder gear 136. A gear 203 meshes with the idler 201 and is secured to a shaft 205 which supports the code strip holder 110. A cam 207 is also mounted on the shaft 205 and is adapted to operate a switch 209 after the code strip has rotated through an initial interval. The switch 209 may be employed to produce a signal which may be transmitted to the receiving station to start the printer when it is desired to print a heading corresponding to the code strip, if any, that may be on the code strip holder.

It will be seen that the code strip holder 110 has a curved outer surface 211 against which the code strip may be placed. The clamping plate 112 is curved to fit against the surface 211 and is swingable about pivots 213. One or more springs 215 may be employed to bias the clamping plate 112 against the code strip holder 110. As shown to advantage in FIG. 6, the clamping plate 112 may be formed with a longitudinal slot 217, through which the portion of the code strip to be scanned is visible.

It has already been indicated that the rollers 52, 54 and 66 may be continuously driven. As shown to advantage in FIGS. 2 and 9, the roller 54 may be mounted on a shaft 220 which carries a gear 222, meshing directly with the continuously driven gear 146. The roller 52 may be frictionally driven by the roller 54. The tapes 64 may be employed to drive the roller 66.

Figures 23, 24:
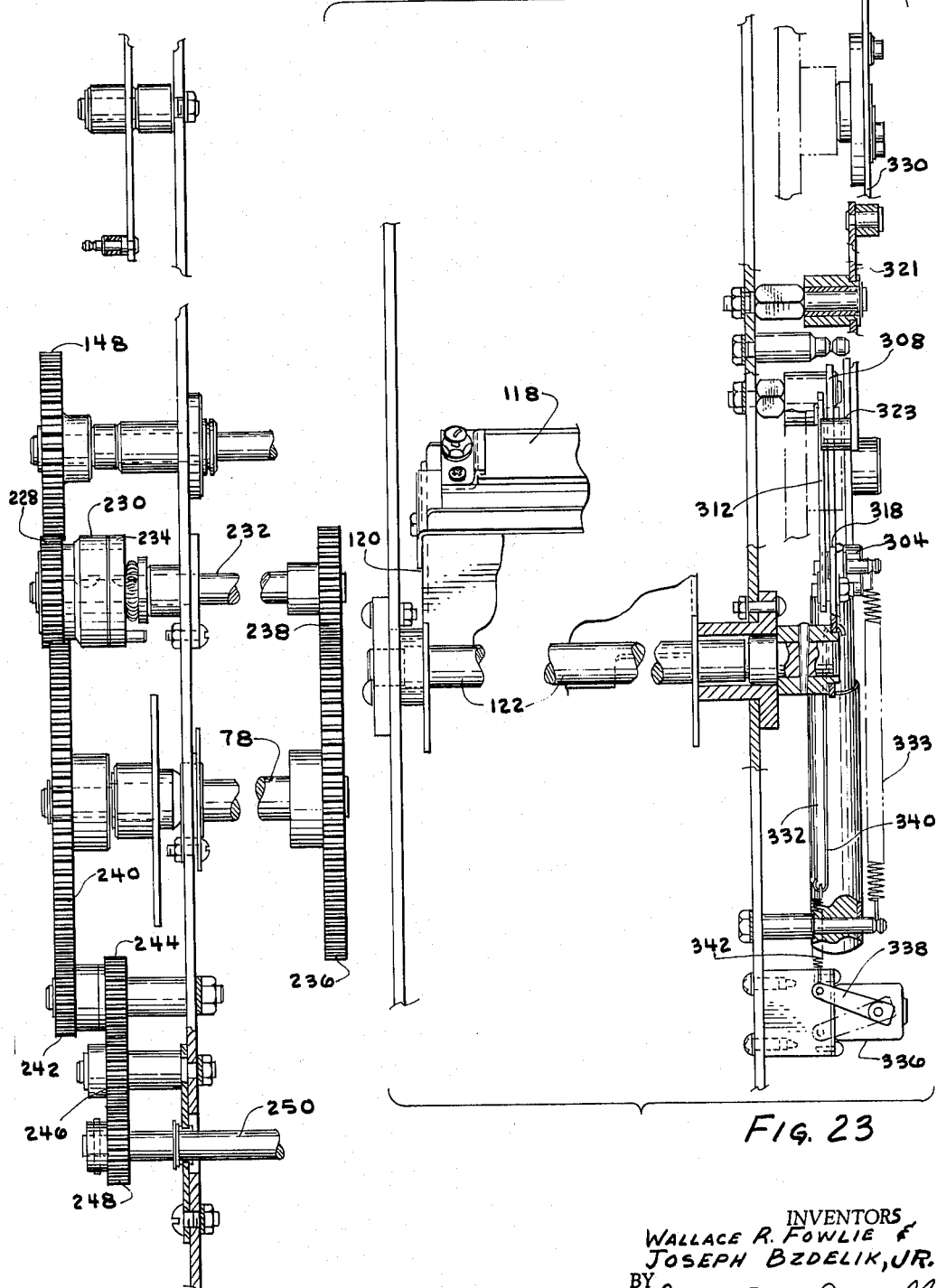
FIG. 23 is a section taken generally along a broken line 23—23 in FIG. 22.
FIG. 24 is a section through the gear train of FIG. 14.

It has already been indicated that the stamp 70 is preferably rotated through a single revolution for each cycle of the scanning machine. Those skilled in the art will be familiar with various single revolution driving devices which may be employed to rotate the stamp 70. As shown to advantage in FIGS. 2 and 14, the illustrated machine employs a single revolution clutch mechanism 226 which is of the same type as the clutch mechanism 132 employed to drive the main cylinder 32. The gear train associated with the clutch mechanism 226 is also shown to advantage in FIG. 24. The gear train comprises a gear 228 which meshes with the continuously driven gear 148. A wedging type control clutch 230 is connected between the gear 228 and a shaft 232. As in the case of the clutch 144, the clutch 230 comprises a control hub 234 which normally rotates with the gear 228 and the shaft 232 but may be stopped to disengage the drive between the gear 228 and the shaft 232. The shaft 78 for the stamp 70 carries a gear 236 which meshes with a gear 238 mounted on the shaft 232. The stamp shaft 78 also carries a gear 240 which drives the inking rollers 72 and 74 through successive gears 242, 244, 246 and 248. The gears 242, 244 and 246 are idler gears, while the gear 248 is mounted on a shaft 250 which carries the ink transfer roller 72. The ink pad roller 74 may be frictionally driven by the ink transfer roller 72.

The ratios of the gears are such that the stamp shaft 78 is driven through one revolution while the gear 228 rotates through three revolutions, as before, a pin 252 is mounted on the control hub 234 of the clutch 230 and is adapted to be stopped by a hook 254 on a lever 256. A spring 258 biases the lever 256 in such a direction (counterclockwise) that the hook 254 normally engages and holds the pin 252 in a stationary position. A solenoid 260 may be provided to swing the lever 256 in a clockwise direction so as to disengage the hook 254 from the pin 252. This results in the engagement of the clutch 230 so that the shaft 232 will be driven by the gear 228.

The lever 256 also carries a roller 262 which is engageable with a cam 264 on the stamp shaft 78. It will be seen that the cam 264 has a steeply rising shoulder or stop 266 adapted to engage the roller 262 when the cam is rotated to its home position. After the stamp shaft 78 has been rotated through a small angle, the cam 264 prevents the lever 256 from returning to its original position until shortly before the cam reaches its home position. After one revolution of the cam 264, the hook 254 engages the pin 252 to disengage the clutch 230. The stop 266 on the cam engages the roller 262 so that the cam and the stamp shaft 78 will be stopped in the correct position. During the single revolution of the stamp shaft 78, the gear 228 rotates through three revolutions.

The solenoid 260 may be energized by a switch 270 which is operated by a cam 272 on the main cylinder shaft 134. In this way, the rotation of the stamp shaft 78 is delayed until the main cylinder 32 has completed a large portion of its revolution. This delay allows time for the leading portion of the document to be propelled into the proper position for receiving the impression of the stamp 70. The impression of the stamp 70 is applied to the document as the stamp passes the impression roller 74, near the end of the single revolution of the stamp.

It has already been indicated that the document to be transmitted is propelled to the main cylinder between the guide plates 40 and 42 by the nip rollers 36 and 38, which are driven when the main cylinder is rotated. When the leading edge of the document reaches the main cylinder 32, the document is held against the main cylinder by vacuum or suction, acting through a series of vacuum ports 281 which are formed in the cylinder, as shown to advantage in FIGS. 10 and 11. The ports 281 are arranged in longitudinal rows on the surface of the cylinder 32. The rows of ports 281 cover approximately 90 degrees of the surface of the main cylinder 32. The vacuum ports 281 of each row communicate with a longitudinal passage 283 in the cylinder, each row being provided with a separate longitudinal passage 283.

As shown in FIG. 10, one end of the cylinder 32 is fitted with a ring-shaped slide valve member 285 which rotates with the cylinder. The valve member 285 is formed with a series of valve ports 287 which communicate with the longitudinal passages 283. As shown to advantage in FIGS. 9 and 10, a stationary or nonrotating slide valve member 289 engages the rotary slide valve member 285. A spring 291 may be provided to press the stationary member 289 against the rotary member 285. It will be seen that an arcuate valve passage or port 293 is formed in the stationary valve member 289 and is adapted to register with the valve ports 287 during a portion of the revolution of the main cylinder 32. The arcuate valve port 293 is connected to a suitable vacuum pump. In this case, the arcuate port 293 extends for an angle of approximately 140 degrees. The initial or leading valve port 287 comes into registration with the arcuate port 293 after the main cylinder 32 has rotated somewhat less than 90 degrees. At this time the document has reached the main cylinder 32, so that the leading edge of the document is sucked against the cylinder 32. As the successive valve ports 287 come into registration with the arcuate port 293, the successive rows of vacuum ports 281 also suck the document against the cylinder 32.

The successive valve ports 287 move out of registration with the arcuate port 293 adjacent the stripper fingers 46 so that the vacuum ceases to operate on the document as the stripper fingers 46 feel the document from the surface of the cylinder 32 and feed the document between the guide plates 48 and 50. It will be seen that the stripper fingers 46 extend into peripheral grooves 296 formed in the cylinder 32.

After the main cylinder 32 has completed its single revolution, its stops rotating. Thereafter, the document, if it is longer than the minimum length, is pulled around the cylinder 32 by the rollers 52 and 54, as already indicated. In its stopped position, the cylinder 32 presents a smooth cylindrical surface 298 to the document so that the document will slide easily around the cylinder 32.

Figure 22:
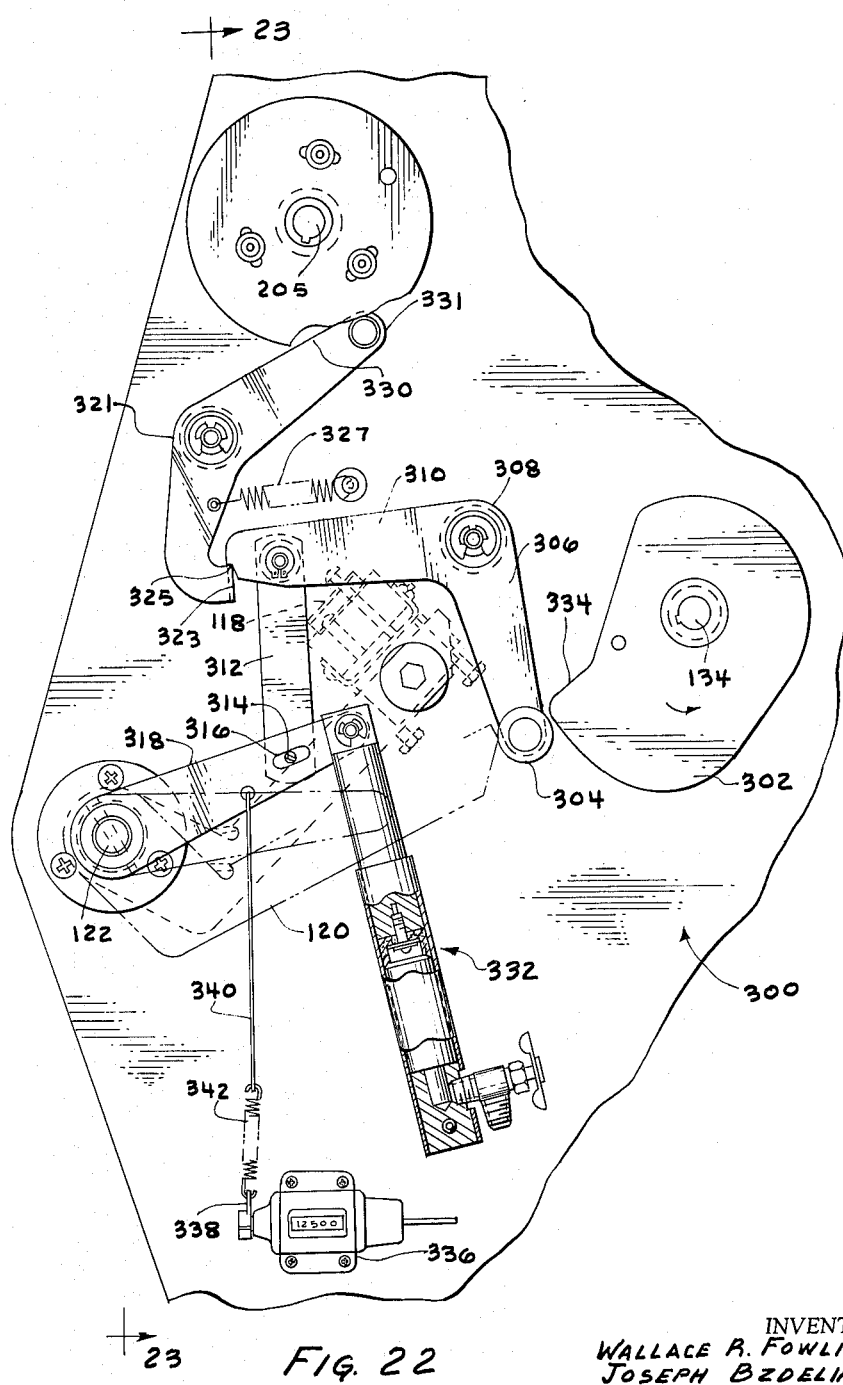
FIG. 22 is a fragmentary side elevation showing the operating mechanism for the flip mirror.

The code strip on the code strip holder 110 is scanned during the initial movement of the document from the feed rollers 36 and 38 to the scanning zone 44. During this interval, the flip mirror 119 is raised to reflect the light from the code strip scanning zone 114 into the lens 88, and then is returned to its original position, so that the light from the main scanning zone 44 may pass through the lens 88. The carriage or support 120 for the flip mirror 118 is illustrated to advantage in FIGS. 19–21. FIG. 22 illustrates a mechanism 300 for operating the flip mirror 118.

It has already been indicated that the flip mirror 118 is mounted on the carriage 120 which is secured to the shaft 122. Provision is made for adjusting the position of the flip mirror 118 on the carriage 120. For the purpose of raising the flip mirror 118, the mechanism 300 comprises a cam 302 which may be mounted on the main cylinder shaft 134. The cam 302 is engaged by a follower roller 304 mounted on one arm 306 of a lever 308. It will be seen that the lever 308 has another arm 310 to which one end of a link 312 is pivotally connected. The other end of the link 312 carries a pin 314 which extends through a longitudinal slot 316 in an arm 318 secured to the shaft 122 of the flip mirror carriage 120.

During the initial rotation of the main cylinder 32, the cam 302 causes the lever 308 to swing clockwise, whereupon the link 312 raises the arm 318 and the flip mirror 118. Means are provided for latching the lever 308 in this position. Thus, the lever 308 includes a latching lever 321 having a flange or pawl 323 thereon which is movable under a latching shoulder 325 on the arm 310. A spring 327 biases the lever 321 counterclockwise and thus tends to move the latching pawl 323 under the shoulder 325. After the code strip has been scanned, the latching lever 321 is swung clockwise by a cam 330 on the code strip holder shaft 205 so as to release the lever 310. The cam 330 engages a roller 331 on the lever 321. The flip mirror 118 and its carriage 120 then drop downwardly under the urging of a spring 333 but controlled by a dashpot or snubber 332 which is connected to the arm 318. The dashpot 332 retards the downward movement of the flip mirror carriage 120. The cam 302 has a steeply dropping portion 334 to provide for the return movement of the lever 308.

A counter 336 may be provided to count the number of documents transmitted by the machine. As shown to advantage in FIG. 22, the counter 336 has an arm 338 which is connected to the arm 318 on the flip mirror shaft 122 by means of a link 340 in series with a spring 342. Thus, the counter 336 registers the number of operating cycles of the machine.

FIG. 28 illustrates a shield 345 which is provided to regulate the amount of light passing from the main scanning zone 44 to the lens 88. The shield 345 has tapered end portions 347 so as to permit more light to pass from the end portions of the scanning zone 44 to the lens 88 than from the central portion of the scanning zone. The shield 345 compensates for the fact that the tubular lamp 80 normally illuminates the central portion of the scanning zone with a somewhat greater intensity than the end portions. The shield 345 is adjustably mounted on a cross bar 349. It will be seen that the shield 345 is between the lens 88 and the raised position of the flip mirror 118, so that the shield also compensates for nonuniform illumination of the code strip scanning zone 114.

Although the operation of the scanning machine has already been described in detail, it may be helpful to present a brief summary. The document to be scanned is placed on the inclined feed platform 44 so that the document engages the nip rollers 36 and 38. The operator energizes the solenoid 170 so as to cause the main cylinder 32 to rotate through a single revolution. The nip rollers 36 and 38 are driven from the main cylinder 32 so that they commence rotation and propel the document between the guide plates 40 and 42 to the surface of the main cylinder 32. The leading edge of the document is then sucked against the cylinder 32 by the vacuum ports 281, shown to advantage in FIG. 11. The vacuum carries the documents around the cylinder 32 until the leading edge of the document reaches the stripper 46, which peels the document from the cylinder 32 and feeds it between the guide plates 48 and 50 to the nip rollers 52 and 54. Finally, the document is delivered to the receiving tray 68 by the delivery tapes 64.

In passing along the tapes 64, the document receives the impression of the stamp 70 which acts against the impression roller 74. The stamp 70 is rotated through one revolution at a time which is somewhat delayed with respect to the rotation of the main cylinder 32. The stamp 70 receives its ink from the ink transfer roller 72 which in turn engages the ink pad roller 74. During the movement of the document from the rollers 36 and 38 to the scanning zone 44, the code strip on the code strip holder 110 is scanned. Both the main scanning zone 44 and the code strip scanning zone 114 are illuminated by the tubular lamp 80, through slots 84 and 116 in the lamp housing 82. The code strip holder 110 is driven with the main cylinder 32. During the initial movement of the main cylinder 32, the flip mirror 118 is raised by the action of the cam 302 (FIG. 22) so as to reflect the light from the code strip scanning zone 114 into the lens 88. After the code strip has been scanned, the flip mirror 118 is dropped down by the releasing movement of the latch lever 321. The light from the main scanning zone 44 then passes to the lens 88.

The effect of the lens 88 is to collimate the light and to direct the light against the rapidly rotating mirror 90. After reflection by the mirror 90, the light is focused by the lens 88 on the target or screen 98 in front of the photoelectric translating device 104, which generates the facsimile signals. The target 98 has a small aperture 100 therein. Each of the many faces 96 of the mirror 90 sweeps the image of the scanning zone across the aperture 100 in the target 98 so that the document is effectively scanned along a series of closely spaced lines. The aperture 124 in the lamp housing 82 produces a synchronizing spot of light, which is reflected into the lens 88 by the diagonal mirrors 126 and 128. The phototube 104 converts this spot of light into a synchronizing pulse.

It has already been noted that the main cylinder 32 is rotated through only a single revolution for each document to be transmitted. If the document is longer than the minimum length, the rollers 52 and 54 continue to propel the document after the cylinder 32 has been stopped. However, the document slides along the surface of the cylinder 32. The roller 38 is provided with a one-way overrunning clutch so that the tail end of the document may be pulled between the rollers 36 and 38 after the main cylinder 32 has been stopped. The rollers 52, 54 and 66 are driven continuously.

It will be recognized that the facsimile scanning machine is extremely efficient and versatile in that it is capable of handling documents ranging in length from a minimum length to any desired greater length. The machine is capable of transmitting a code strip which is printed as a heading on each document at the receiving station. This code strip may give information which is common to all documents, such as the place of transmission and the desired routing of the documents.

Various modifications, alternative constructions and equivalents may be employed without departing from the true spirit and scope of the invention, as exemplified in the foregoing description, and defined in the following claims.

We claim:

1. A facsimile scanning machine, comprising a main cylinder, a feed platform for receiving a document to be scanned, a pair of interengaging feed rollers for feeding the document from said platform to said cylinder, guide means for guiding the document between said rollers and said cylinder, vacuum means on said cylinder for sucking the document against said cylinder, drive means for rotating said cylinder through a single revolution, said cylinder being adapted to advance the document through a predetermined distance during said revolution, a pair of interengaging delivery rollers, means for continuously driving said delivery rollers whereby said delivery rollers will cause the document to slide around said cylinder after said cylinder has completed its single revolution if the length of the document exceeds said predetermined distance, means for stripping the document from said cylinder and guiding the document between said delivery rollers, delivery tape means, means for carrying the document from said delivery rollers to said delivery tape means, a rotary stamp for engaging the document as it travels along said delivery tape means, means for rotating said rotary stamp through a single revolution in delayed response to the rotation of said main cylinder through its revolution whereby said stamp engages each document only once, and an impression roller opposite said rotary stamp and adjacent said delivery tape means for backing up the document as it is engaged by said stamp.

2. In a facsimile scanning machine, the combination comprising a main cylinder, means for rotating said main cylinder through a single revolution, feed means for receiving a document to be scanned and for feeding the document to the main cylinder, said feed means having a driving connection to said main cylinder for operation therewith, delivery means for receiving the document from the main cylinder, means for continuously driving said delivery means, a rotary stamp for engaging said document as it travels along said delivery means, means for rotating said stamp through a single revolution in delayed response to the rotation of said main cylinder, a rotary code strip holder having means thereon for holding a code strip, means forming a driving connection between said main cylinder and said code strip holder for rotating said code strip holder simultaneously with said main cylinder through a single revolution, and means for scanning said code strip holder during an initial portion of the revolution of said main cylinder and then scanning the document on said main cylinder.

3. In a facsimile scanning machine, the combination comprising a main cylinder for receiving a document to be scanned, means for initiating rotation of said main cylinder, a rotary code strip holder adjacent said main cylinder and having means for holding a code strip, means for rotating said code strip holder with said main cylinder, means for illuminating a main scanning zone on said main cylinder, means for illuminating a code strip scanning zone along the path of said code strip holder, and means for scanning said code strip scanning zone during the initial rotation of said main cylinder and said code strip holder, and then subsequently scanning said main scanning zone on said main cylinder.

4. In a facsimile scanning machine, the combination comprising a main cylinder for receiving a document to be scanned, means for rotating said main cylinder, a rotary code strip holder, means for rotating said code strip holder with the main cylinder, means for illuminating a main scanning zone on said main cylinder, means for illuminating a code strip scanning zone along the path of said code strip holder, scanning means for scanning said main scanning zone on said main cylinder, a mirror movable into an advanced position between said main scanning zone and said scanning means for directing light from said code strip scanning zone to said scanning means, and means for moving said mirror into said advanced position during initial rotation of said main cylinder for scanning said code strip holder, said last-mentioned means including means for retracting said mirror out of the path between said main scanning zone and said scanning means for scanning the document on said main cylinder after initial rotation thereof.

5. In a facsimile scanning machine, the combination comprising a main cylinder for receiving a document to be scanned, drive means for rotating said main cylinder through a single revolution, delivery means for taking the document from said main cylinder, means for driving said delivery means for a longer interval than said main cylinder, a rotary code strip holder, means connecting said code strip holder to said drive means for rotation through a single revolution with said main cylinder, scanning means for scanning a main scanning zone on said main cylinder, and means operable by said driving means during initial rotation of said main cylinder for diverting said scanning means to said code strip holder for initially scanning a code strip scanning zone thereon.

6. A facsimile scanning machine, comprising a main cylinder, a feed platform for receiving a document to be scanned, a pair of interengaging feed rollers for feeding the document from said platform to said cylinder, guide means for guiding the document between said rollers and said cylinder, means on said cylinder for holding the document against said cylinder, drive means for rotating said cylinder through a single revolution, said cylinder being adapted to advance the document through a predetermined distance during said revolution, a pair of interengaging delivery rollers, means for continuously driving said delivery rollers, and means for stripping the document from said cylinder and guiding the document between said delivery rollers whereby said delivery rollers will cause the document to slide around said cylinder if the length of said document exceeds said predetermined distance.

7. In a facsimile scanning machine, the combination comprising a main cylinder for receiving a document to be scanned, drive means for rotating said main cylinder, delivery means for taking the document from said main cylinder, a rotary code strip holder, means connecting said code strip holder to said drive means for rotation with said main cylinder, scanning means for scanning a main scanning zone on said main cylinder, and means operable by said driving means during initial rotation of said main cylinder for diverting said scanning means to said code strip holder for initially scanning a code strip scanning zone thereon.

8. In a facsimile scanning machine, the combination comprising a main cylinder for receiving a document to be scanned, drive means for rotating said main cylinder through a single revolution, delivery means for taking the document from said main cylinder, a rotary code strip holder, means forming a connection between said drive means and said code strip holder for rotating said code strip holder through a single revolution with said main cylinder, means for illuminating a main scanning zone on said main cylinder, means for illuminating a code strip scanning zone on said code strip holder, scanning means for scanning said main scanning zone, a movable mirror for diverting light from said code strip scanning zone to said main scanning means, and means operable by said drive means during initial rotation of said main cylinder for moving said mirror into the light path between said main scanning zone and said scanning means during initial rotation of said main cylinder.

9. In a facsimile scanning machine, the combination comprising a main cylinder for receiving a document to be scanned, drive means for rotating said main cylinder, a rotary code strip holder, means for rotating said code strip holder with the main cylinder, means for illuminating a main scanning zone on said main cylinder, means for illuminating a code strip scanning zone along the path of said code strip holder, scanning means for scanning said main scanning zone on said main cylinder, a mirror movable into an advanced position between said main scanning zone and said scanning means for directing light from said code strip scanning zone to scanning means, and a cam operable by said drive means for moving said mirror into said advanced position during initial rotation of said main cylinder for scanning said code strip holder, latch means for latching said mirror in said advanced position, and means operable by said drive means during further rotation of said main cylinder for releasing said latch means to retract said mirror out of the path between said main scanning zone and said scanning means for scanning the document on said main cylinder after initial rotation thereof.

10. In a facsimile machine, the combination comprising a main cylinder, means for rotating said main cylinder through a single revolution, feed means for feeding a sheet to the main cylinder, said feed means having a driving connection to said main cylinder for operation therewith, said cylinder having means for advancing the sheet through a predetermined distance during said revolution, delivery means for taking the sheet from the main cylinder, and means for continuously driving said delivery means whereby said delivery means will cause the sheet to slide around said cylinder after said cylinder has completed its revolution if the length of said sheet is greater than said distance.

11. In a facsimile machine, the combination comprising a main cylinder, means for feeding a sheet to said cylinder, vacuum means on said cylinder for sucking the sheet against said cylinder, drive means for rotating said cylinder through a single revolution, said cylinder thereby being adapted to advance the sheet through a predetermined distance during said revolution, delivery means for taking the sheet from said cylinder, and means for continuously driving said delivery means whereby said delivery means will cause the sheet to slide around said cylinder after said cylinder has completed its revolution if the length of said sheet exceeds said predetermined distance.

12. In a facsimile machine, the combination comprising a main cylinder, drive means for rotating said main cylinder through a single revolution, feed means operable by said drive means for feeding a sheet to said main cylinder, delivery means for taking the sheet from said main cylinder, means for continuously driving said delivery means, and vacuum means for sucking said sheet against said main cylinder during the single revolution thereof, said delivery means being effective to slide the sheet across said main cylinder after the single revolution thereof, said vacuum means comprising means forming a plurality of rows of vacuum openings on a portion of the surface of said main cylinder, a vacuum valve including a rotatable member secured to said cylinder and having a plurality of angularly spaced vacuum ports communicating with the respective rows of said vacuum openings, and a stationary valve member opposite said rotatable member and having an arcuate vacuum supply port therein, said vacuum ports in said rotatable member being movable successively into and out of registration with said arcuate vacuum supply port for progressively applying vacuum to said vacuum openings as said sheet engages said main cylinder.

13. In a facsimile machine, the combination comprising a main cylinder, drive means for rotating said main cylinder, feed means operable by said drive means for feeding a sheet to said main cylinder, delivery means for taking the sheet from said main cylinder, and vacuum means for sucking said sheet against said main cylinder, said vacuum means comprising means forming a plurality of rows of vacuum openings on a portion of the surface of said main cylinder, a vacuum valve including a rotatable member secured to said cylinder and having a plurality of angularly spaced vacuum ports communicating with the respective rows of said vacuum openings, and a stationary valve member opposite said rotatable member and having an arcuate vacuum supply port therein, said vacuum ports in said rotatable member being movable successively into and out of registration with said arcuate vacuum supply port for progressively applying vacuum to said vacuum openings as said sheet engages said main cylinder.

14. In a facsimile scanning machine,
the combination comprising a cylinder for receiving a document to be scanned,
drive means for rotating said cylinder,
delivery means for taking the document from said cylinder,
a rotary code strip holder,
means for rotating said code strip holder,
scanning means for scanning a scanning zone on said cylinder,
and means operable by said driving means during part of the rotation of said cylinder for diverting said scanning means to said code strip holder for scanning a secondary scanning zone thereon.

15. In a facsimile scanning machine,
the combination comprising a cylinder for receiving a document to be scanned,
drive means for rotating said cylinder,
delivery means for taking the document from said cylinder,
scanning means for scanning a primary scanning zone on said cylinder,
and means operable by said driving means during part of the rotation of said cylinder for diverting said scanning means to a secondary scanning zone.

16. In a facsimile machine,
the combination comprising a facsimile cylinder,
means for feeding a sheet to said cylinder,
delivery means for taking said sheet from said cylinder,
means on said cylinder for taking and propelling said sheet through less than one revolution between said feeding means and said delivery means,
drive means for rotating said cylinder through a single revolution so that said cylinder is returned to its initial position,
and means for continuously driving said delivery means whereby said delivery means is adapted to cause sheets to slide around said cylinder after said cylinder has completed its single revolution,
said machine thereby being adapted to handle sheets having a length exceeding the movement that may be imparted to said sheets by said cylinder during the single revolution thereof.

17. In a facsimile machine,
the combination comprising a main cylinder,
means for feeding a sheet to said cylinder,
delivery means for taking said sheet from said cylinder,
means on said cylinder for taking and propelling said sheet between said feeding means and said delivery means,
drive means for rotating said cylinder through a predetermined angular interval and then stopping said cylinder in a position for starting another cycle,
and means for continuously driving said delivery means whereby said delivery means is adapted to cause sheets to slide around said cylinder after said cylinder has been stopped,
said machine thereby being adapted to handle sheets having a length exceeding the movement that may be imparted to the sheets by said cylinder during the movement thereof through said predetermined angular interval.

18. In a facsimile scanning machine,
the combination comprising a cylinder for receiving a document to be scanned,
drive means for rotating said cylinder,
a stationary scanning unit opposite said cylinder for scanning a primary scanning zone on said cylinder,
a movable mirror disposed adjacent the line of sight between said cylinder and said scanning unit,
and means for moving said mirror into said line of sight and at an angle thereto to divert said scanning unit to a secondary scanning zone disposed along a substantially different line of sight from said primary scanning zone.

References Cited by the Examiner

UNITED STATES PATENTS

| | | | |
|---|---|---|---|
| 2,184,229 | 12/1939 | Spiess | 271—27 |
| 2,312,626 | 3/1943 | Chamberlin et al. | 101—234 |
| 2,451,080 | 10/1948 | Finch et al. | 271—3 |
| 2,843,663 | 7/1958 | Hell et al. | 178—7.1 |
| 3,087,987 | 4/1963 | Stone | 178—7.6 |

DAVID G. REDINBAUGH, *Primary Examiner.*

J. A. O'BRIEN, *Assistant Examiner.*